United States Patent
Tamaoka et al.

(10) Patent No.: US 8,508,882 B1
(45) Date of Patent: Aug. 13, 2013

(54) SPINDLE MOTOR HAVING MAGNETIC CIRCUIT FOR STATOR AND ROTOR MAGNET, AND STORAGE DISK DRIVE HAVING THE SAME

(75) Inventors: Takehito Tamaoka, Kyoto (JP); Hiroyuki Abe, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/568,207

(22) Filed: Aug. 7, 2012

Related U.S. Application Data

(63) Continuation of application No. 13/033,778, filed on Feb. 24, 2011, now Pat. No. 8,259,408.

(60) Provisional application No. 61/407,163, filed on Oct. 27, 2010.

(30) Foreign Application Priority Data

Aug. 31, 2010 (JP) .................................. 2010-195009

(51) Int. Cl.
*G11B 19/20* (2006.01)
(52) U.S. Cl.
USPC ....................................................... 360/99.08
(58) Field of Classification Search
USPC ...................................................... 369/263.1
See application file for complete search history.

(56) References Cited

U.S. PATENT DOCUMENTS

| | | | | |
|---|---|---|---|---|
| 5,545,937 A | * | 8/1996 | Dunfield et al. | 310/90.5 |
| 5,694,268 A | * | 12/1997 | Dunfield et al. | 360/98.07 |
| 6,249,505 B1 | * | 6/2001 | Miyamoto et al. | 369/266 |
| 6,344,946 B1 | * | 2/2002 | Papst | 360/99.08 |
| 6,787,954 B2 | * | 9/2004 | Yoshitsugu et al. | 310/90 |
| 7,122,922 B2 | * | 10/2006 | Xu et al. | 310/51 |
| 7,911,734 B2 | * | 3/2011 | Wakitani et al. | 360/99.08 |
| 8,056,210 B2 | * | 11/2011 | Gomyo et al. | 29/596 |
| 8,169,738 B1 | * | 5/2012 | Yawata et al. | 360/99.08 |

OTHER PUBLICATIONS

Tamaoka et al., "Spindle Motor Having Magnetic Circuit for Stator and Rotor Magnet, and Storage Disk Drive Having the Same", U.S. Appl. No. 13/033,778, filed Feb. 24, 2011.

* cited by examiner

*Primary Examiner* — Mark Blouin
(74) *Attorney, Agent, or Firm* — Keating & Bennett, LLP

(57) ABSTRACT

A spindle motor includes a base portion; a stator arranged above the base portion; a rotor hub including a cover portion positioned above the stator, and a side wall portion arranged to extend downward from an outer edge of the cover portion; a rotor magnet positioned radially outward of the stator, and fixed to an inner circumferential surface of the side wall portion of the rotor hub; and a bearing mechanism arranged to support the rotor hub and the rotor magnet to be rotatable. A height of the rotor magnet as measured in an axial direction is preferably in a range of about 2 mm to about 3 mm (both inclusive), and a height of a stator core of the stator as measured in the axial direction is preferably in a range of about 50% to about 75% (both inclusive) of the height of the rotor magnet.

26 Claims, 6 Drawing Sheets

SPINDLE MOTOR HAVING MAGNETIC CIRCUIT FOR STATOR AND ROTOR MAGNET, AND STORAGE DISK DRIVE HAVING THE SAME

BACKGROUND OF THE INVENTION

1. Field of the Invention

The present invention relates to a spindle motor and more specifically to a spindle motor for use in a disk drive apparatus.

2. Description of the Related Art

Spindle motors (hereinafter referred to simply as "motors") have often been installed in disk drive apparatuses, such as hard disk drive apparatuses. In an outer-rotor motor disclosed in JP-A 2004-135467, a rotor assembly includes a cup-shaped rotating hub body and a driving magnet, while a stator assembly includes a stator core and driving coils wound on the stator core. The driving magnet is fixed to an inner circumferential surface of an annular wall portion of the rotating hub body, and is arranged opposite to an outer circumferential surface of the stator core. While the motor is driven, a magnetic action is produced between the driving magnet and the driving coils. JP-A 2008-97803 also discloses a motor in which a permanent magnet is arranged opposite to an outer circumference of an electromagnet.

In recent years, there have been a demand for a reduction in thickness of disk drive apparatuses, and also a demand for a further reduction in thickness of motors installed in the disk drive apparatuses.

SUMMARY OF THE INVENTION

Preferred embodiments of the present invention have been conceived to enable a thin-type motor to produce a sufficient torque during rotation of the motor while reducing occurrence of vibrations and noise.

A spindle motor for use in, for example, a 2.5 inch 7 mm high disk drive apparatus according to an exemplary preferred embodiment of the present invention includes a base portion; a stator arranged above the base portion; a rotor hub including a cover portion positioned above the stator, and a side wall portion arranged to extend downward from an outer edge of the cover portion; a rotor magnet positioned radially outward of the stator, and fixed to an inner circumferential surface of the side wall portion of the rotor hub; and a bearing mechanism arranged to support the rotor hub and the rotor magnet such that the rotor hub and the rotor magnet are rotatable with respect to the base portion and the stator. A height of the rotor magnet as measured in an axial direction is preferably in a range of, for example, about 2 mm to about 3 mm both inclusive, and a height of a stator core of the stator as measured in the axial direction is preferably in a range of, for example, about 50% to about 75% (both inclusive) of the height of the rotor magnet. A torque constant of a torque produced between the stator and the rotor magnet preferably is in a range of, for example, about 3 mNm/A to about 5 mNm/A (both inclusive).

Preferred embodiments of the present invention enable a thin-type motor to produce a sufficient torque while also reducing an occurrence of vibrations and noise.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
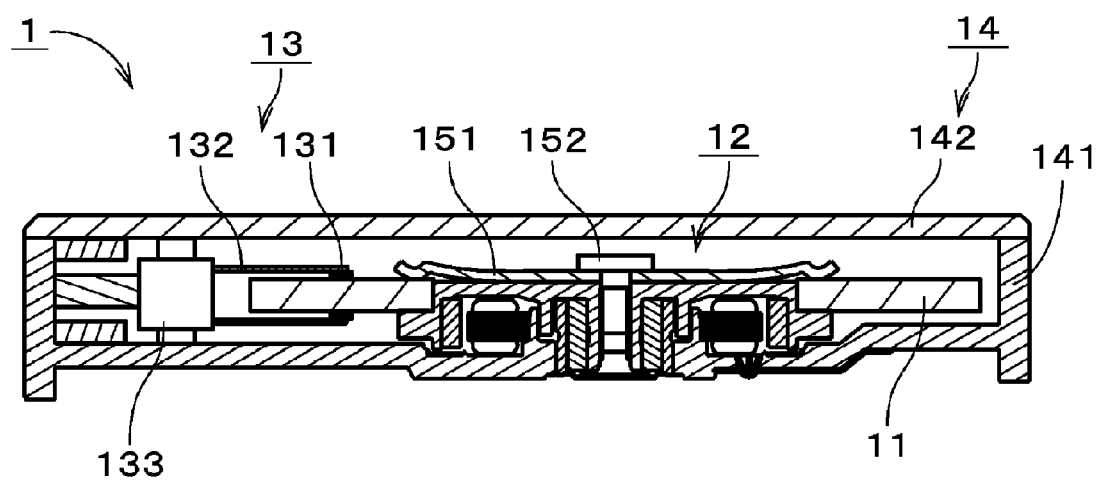
FIG. 1 is a diagram illustrating a disk drive apparatus according to a preferred embodiment of the present invention.

In the present specification, an upper side and a lower side in FIG. 1 in a direction along a central axis of a motor are referred to simply as an "upper side" and a "lower side", respectively. Note that an upward/downward direction is not mentioned with a view to describe a positional relationship or a direction when the motor is actually installed in a device. Moreover, a direction parallel or substantially parallel to the central axis is referred to as an "axial direction", a radial direction extending out perpendicularly or substantially perpendicularly from the central axis is referred to simply as a "radial direction", and a circumferential direction centered on the central axis is referred to simply as a "circumferential direction".

FIG. 1 is a vertical cross-sectional view of a disk drive apparatus 1 including a spindle motor (hereinafter referred to simply as a "motor") according to an exemplary preferred embodiment of the present invention. The disk drive apparatus 1 is preferably a 2.5 inch 7 mm high hard disk drive apparatus, for example. The disk drive apparatus 1 includes a disk 11, a motor 12, an access portion 13, a housing 14, and a clamper 151, for example. The motor 12 is arranged to rotate the disk 11, on which information is recorded. The access portion 13 is arranged to read and/or write information from or to the disk 11.

The housing 14 preferably includes a first housing member 141, which is in the shape of an open box, and a flat second housing member 142. The disk 11, the motor 12, the access portion 13, and the clamper 151 are contained inside the first housing member 141. The second housing member 142 is fitted to the first housing member 141 to define the housing 14. An interior space of the disk drive apparatus 1 is preferably a substantially clean space with extremely little or no dirt and/or dust.

The disk 11 is arranged to be clamped on the motor 12 by the clamper 151. The access portion 13 preferably includes heads 131, arms 132, and a head actuator mechanism 133. Each head 131 is arranged in the vicinity of the disk 11 to magnetically read and/or write information from or to the disk 11. Each arm 132 is arranged to support a separate one of the heads 131. The head actuator mechanism 133 is arranged to move each arm 132 to thereby move the corresponding head 131 relative to the disk 11. The head 131 is thereby arranged to access a desired location on the disk 11 while being placed in the vicinity of the rotating disk 11.

Figure 2:
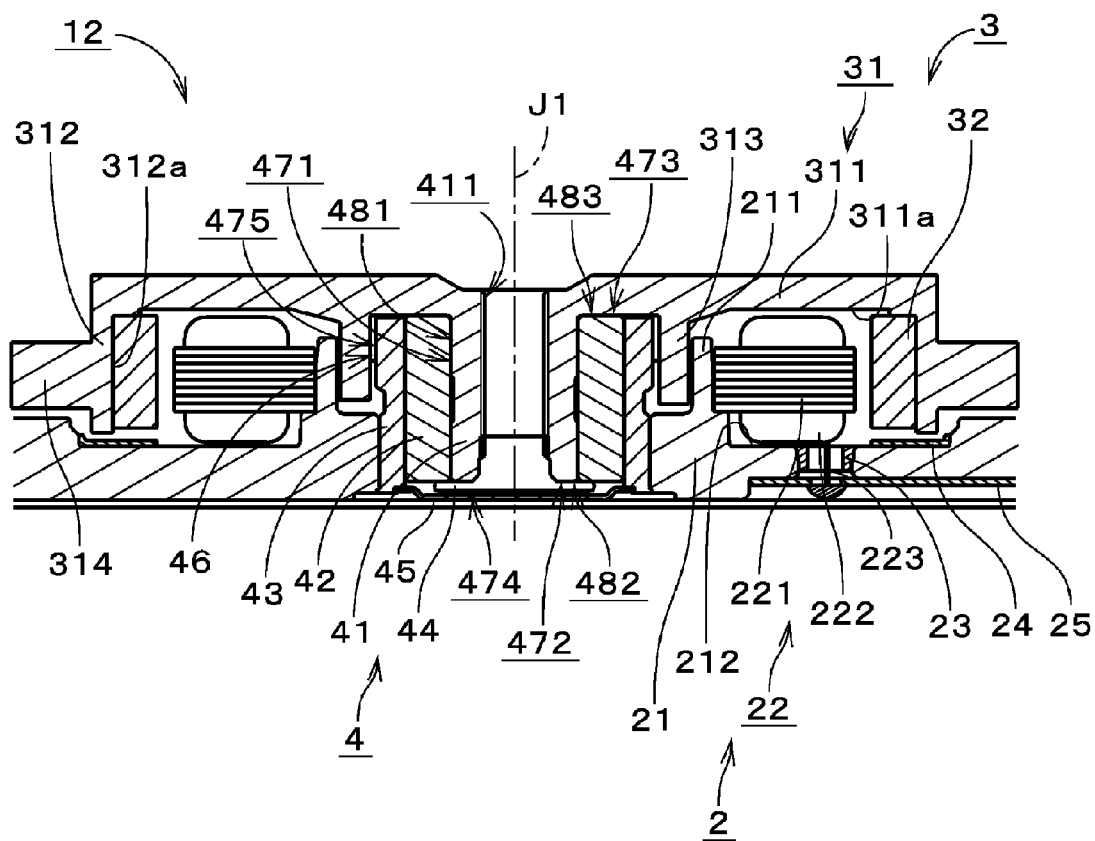
FIG. 2 is a cross-sectional view of a spindle motor according to a preferred embodiment of the present invention.

FIG. 2 is a vertical cross-sectional view of the motor corresponding to a preferred embodiment of the present invention. The motor 12 is preferably an outer-rotor type, and includes a stationary portion 2, which is a stationary assembly, a rotating portion 3, which is a rotating assembly, and a bearing mechanism 4. The stationary portion 2 preferably includes a substantially flat base plate 21, a stator 22, an insulating bushing 23, a magnetic member 24, and a circuit board 25. The base plate 21 defines a portion of the first housing member 141 illustrated in FIG. 1. The stator 22 is preferably arranged above the base plate 21, and includes a stator core 221 and coils 222. A radially inner portion of the stator core 221 is fixed to a circumference of a cylindrical holder 211 in the base plate 21. The magnetic member 24 is in an annular shape and centered on the central axis J1, and is fixed to an upper surface 212 of the base plate 21 through an adhesive. In the stationary portion 2, lead wires 223 of the coils 222 are passed through the insulating bushing 23, and are inserted inside a through hole defined in the base plate 21 together with the insulating bushing 23. End portions of the lead wires 223 are joined to the circuit board 25.

The rotating portion 3 preferably includes a rotor hub 31 and a rotor magnet 32. The rotor hub 31 preferably includes a cover portion 311, a side wall portion 312, a hub tubular portion 313, and a disk mount portion 314. The cover portion 311 is positioned above the stator 22. The hub tubular portion 313 is in the shape of a cylinder and centered on the central axis J1, and is arranged outside the bearing mechanism 4 to extend downward from a lower surface 311a of the cover portion 311. The side wall portion 312 is arranged to extend downward from an outer edge of the cover portion 311. The disk mount portion 314 is arranged to spread radially outward from the side wall portion 312. The disk 11 illustrated in FIG. 1 is mounted on the disk mount portion 314.

The rotor magnet 32 is fixed to an inner circumferential surface 312a of the side wall portion 312, and is positioned radially outward of the stator 22. A neodymium bonded magnet (Nd—Fe—B BOND MAGNET) is preferably used as the rotor magnet 32, but any other desirable type of magnet could be used. The magnetic member 24 is positioned below the rotor magnet 32. A magnetic attraction force is generated between the rotor magnet and the magnetic member 24. This magnetic force works to reduce vibrations in the rotating portion 3 to thus stabilize the rotor rotating portion 3.

While the motor 12 is driven, a torque is produced between the stator 22 and the rotor magnet 32. The torque constant is preferably in the range of about 3 mNm/A to above 5 mNm/A (both inclusive).

The bearing mechanism 4 preferably includes a shaft portion 41, a sleeve 42, a sleeve housing 43, a thrust plate 44, a cap portion 45, and a lubricating oil 46. The shaft portion 41 is arranged to extend downward from a radially inner portion of the cover portion 311. The shaft portion 41 and the rotor hub 31 are preferably defined by a single continuous member. A female screw portion 411 is defined on an inside of the shaft portion 41 throughout the entire length thereof. At a center of the cover portion 311, a male screw 152 illustrated in FIG. 1 is screwed into the female screw portion 411, whereby the clamper 151 is secured to the motor 12.

Aside from the above-described clamping method (hereinafter referred to as a "center clamping method"), there is another clamping method called a hub clamping method. According to the hub clamping method, a plurality of female screw portions are defined on the upper surface of the cover portion of the rotor hub, and male screws are screwed into the female screw portions, whereby the clamper is secured to the motor. In the case of the hub clamping method, because each male screw is secured to the cover portion, the axial position of the cover portion needs to be lowered in accordance with an increased height of a head of each male screw. In addition, the thickness of the cover portion of the hub has to be increased because each male screw is engaged with the hub. Therefore, the center clamping method is suitable for thin-type motors, such as motors of a 7 mm high type, with a view to secure a sufficient space between the lower surface of the cover portion and the upper surface of the base plate.

The shaft portion 41 is inserted inside the sleeve 42. The sleeve housing 43 is positioned inside the hub tubular portion 313. The sleeve 42 is fixed to an inner circumferential surface of the sleeve housing 43. The thrust plate 44 is fixed to a bottom portion of the shaft portion 41 as a result of the male screw portion at the center being screwed into the female screw portion 411. The cap portion 45 is fixed to a lower end of the sleeve housing 43 to close a lower opening of the sleeve housing 43.

In the motor 12, a radial gap 471 defined between an inner circumferential surface of the sleeve 42 and an outer circumferential surface of the shaft portion 41, a first thrust gap 472 defined between a lower surface of the sleeve 42 and an upper surface of the thrust plate 44, and a second thrust gap 473 defined between the lower surface 311a of the cover portion 311 and a combination of an upper surface of the sleeve 42 and an upper surface of the sleeve housing 43 are continuously filled with the lubricating oil 46. A gap 474 defined between a lower surface of the thrust plate 44 and an upper surface of the cap portion 45, and a seal gap 475 defined between an inner circumferential surface of the hub tubular portion 313 and an upper portion of an outer circumferential surface of the sleeve housing 43, are also continuously filled with the lubricating oil 46.

Radial dynamic pressure groove arrays are defined at upper and lower positions on the inner circumferential surface of the sleeve 42. In addition, thrust dynamic pressure groove arrays are defined on the upper surface and the lower surface of the sleeve 42. The radial dynamic pressure groove arrays are arranged to define a radial dynamic pressure bearing portion 481 in the radial gap 471. The thrust dynamic pressure groove arrays are arranged to define a first thrust dynamic pressure bearing portion 482 and a second thrust dynamic pressure bearing portion 483 in the first thrust gap 472 and the second thrust gap 473, respectively. While the motor 12 is driven, the shaft portion 41 and the thrust plate 44 are supported by the radial dynamic pressure bearing portion 481, the first thrust dynamic pressure bearing portion 482, and the second thrust dynamic pressure bearing portion 483, without contact with the sleeve 42, the sleeve housing 43, or the cap portion 45. The rotor hub 31 and the rotor magnet 32 are thereby supported so as to be rotatable with respect to the base plate 21 and the stator 22.

Figure 3:
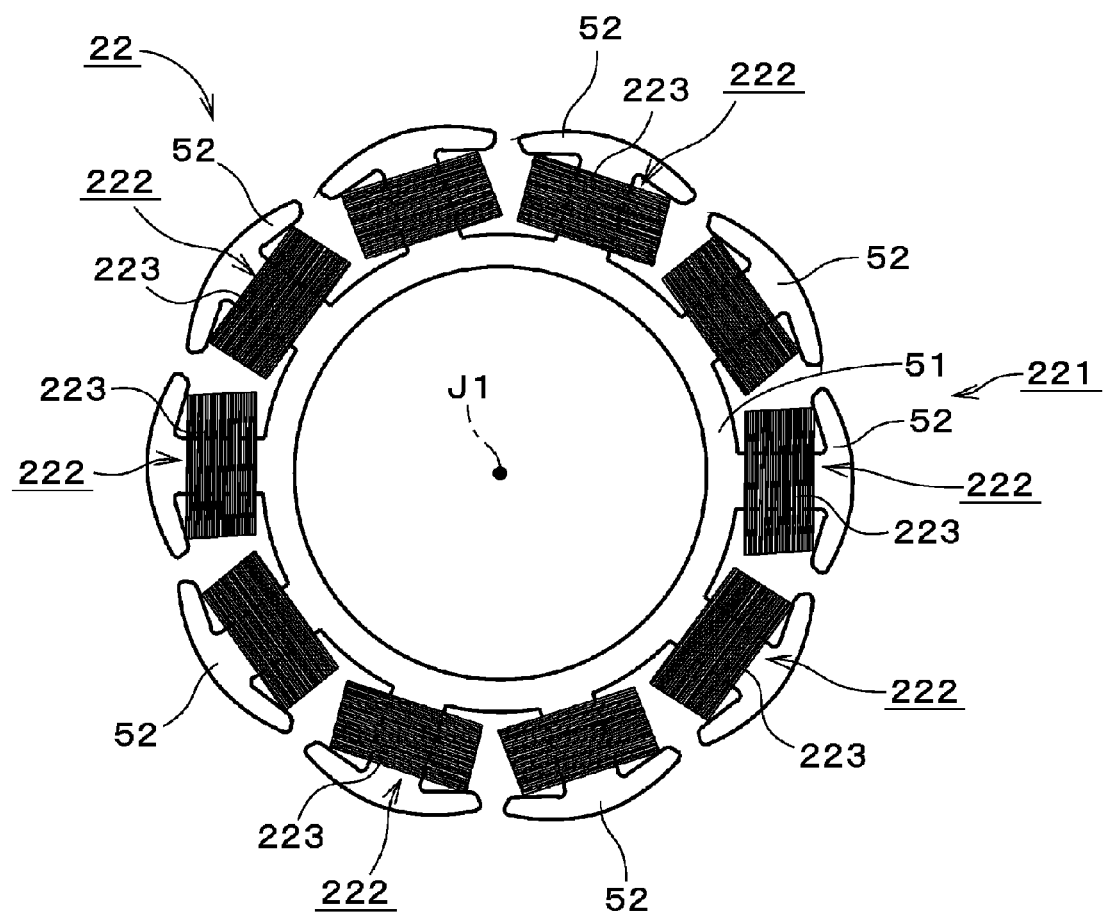
FIG. 3 is a plan view of a stator according to a preferred embodiment of the present invention.

FIG. 3 is a plan view of the stator 22. The stator 22 includes the stator core 221 and the coils 222. The stator core 221 includes a substantially cylindrical central portion 51 and a plurality of tooth portions 52. Each tooth portion 52 is preferably provided substantially in the shape of the letter "T", and is arranged to extend radially outward from an outer circumference of the central portion 51, and, at an outer end portion thereof, spread both ways in the circumferential direction. The lead wire 223 is wound around each tooth portion 52 to define the coils 222.

The coils 222 are arranged between the lower surface 311a of the cover portion 311 of the rotor hub 31 and the upper surface 212 of the base plate 21. The distance H3 (shown in FIG. 4) between the lower surface 311a of the cover portion 311 of the rotor hub 31 and the upper surface 212 of the base plate 21 is preferably about 3.2 mm, for example.

A 7 mm high disk drive apparatus is typically unable to secure a sufficient torque constant, when a conventional motor which is commonly installed in a 9.5 mm high disk drive apparatus and which has a decreased thickness so as to be installed in the 7 mm high disk drive apparatus, is used therein. For example, the torque constant is halved when the height of a motor commonly installed in a 9.5 mm high disk drive apparatus is simply decreased by about 26%. Therefore, the motor 12 used in the disk drive apparatus 1 of the 7 mm high type should be designed to be able to produce a sufficient torque, despite the limited space, while also reducing vibrations and noise. That is, the motor 12 is preferably designed to have a torque constant in the range of, for example, about 3 mNm/A to about 5 mNm/A (both inclusive) in order to be able to produce a sufficient torque despite the limited space, and to be able to reduce vibrations and noise.

The diameter of the lead wire 223 is preferably in the range of, for example, about 0.10 mm to about 0.14 mm (both inclusive). More preferably, the diameter of the lead wire 223 is in the range of about 0.115 mm to about 0.130 mm (both inclusive). The number of turns for each coil 222 is preferably in the range of, for example, about 40 to about 70 (both inclusive). The resistance value of each coil 222 is preferably in the range of, for example, about 3.3Ω to about 5Ω (both inclusive). Notice here that, for 9.5 mm high disk drive apparatuses, a lead wire having a diameter preferably in the range of, for example, about 0.15 mm to about 0.2 mm (both inclusive) is commonly used. The number of turns for each coil is preferably in the range of, for example, about 40 to about 60 (both inclusive). The resistance value of each coil is preferably in the range of, for example, about 1.3Ω to about 4.1Ω (both inclusive). The motor 12 achieves an increased upper limit of the number of turns while minimizing the increase in the resistance value of each coil, despite the limited space, in comparison to the motor commonly used in the 9.5 mm high disk drive apparatus. It is therefore able to produce a sufficient torque during the rotation of the motor, despite the limited space, while reducing the occurrence of vibrations and noise.

Figure 4:
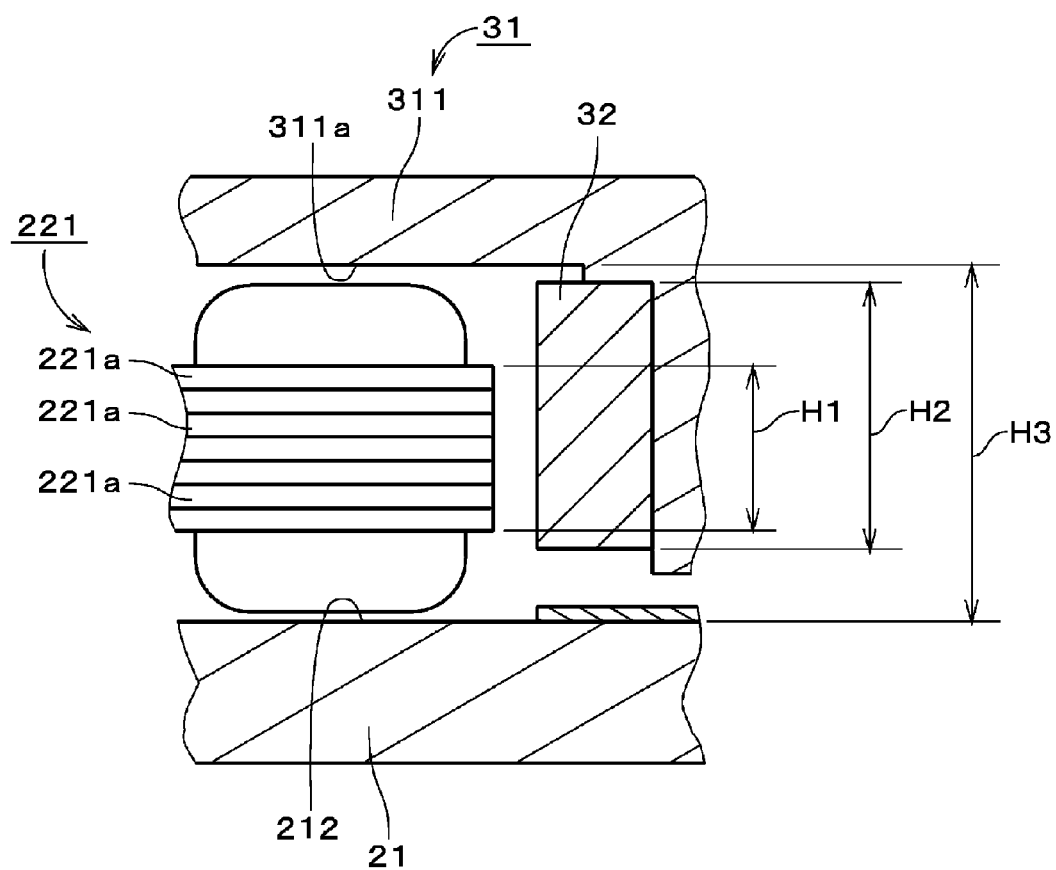
FIG. 4 is an enlarged view of a portion of the spindle motor.

FIG. 4 is an enlarged view of the rotor magnet 32 and its vicinity illustrated in FIG. 2. The stator core 221 is preferably defined by laminated magnetic steel sheets 221a. Each of the magnetic steel sheets 221a preferably has a thickness of about 0.2 mm, for example. In the present preferred embodiment, the number of magnetic steel sheets 221a preferably is seven, for example, though any other desirable number of magnetic steel sheets 221a could be used. The height H1 of the stator core 221, as measured in the axial direction, is preferably about 1.4 mm, for example.

The height H2 of the rotor magnet 32, as measured in the axial direction, is preferably about 2.3 mm, for example. The ratio of the height H1 of the stator core 221 to the height H2 of the rotor magnet 32 (hereinafter referred to as a "core-magnet height ratio") preferably is about 61%, for example. As noted previously, the distance H3 between the lower surface 311a of the cover portion 311 of the rotor hub 31 and the upper surface 212 of the base plate 21 is preferably about 3.2 mm, for example.

Figure 5:
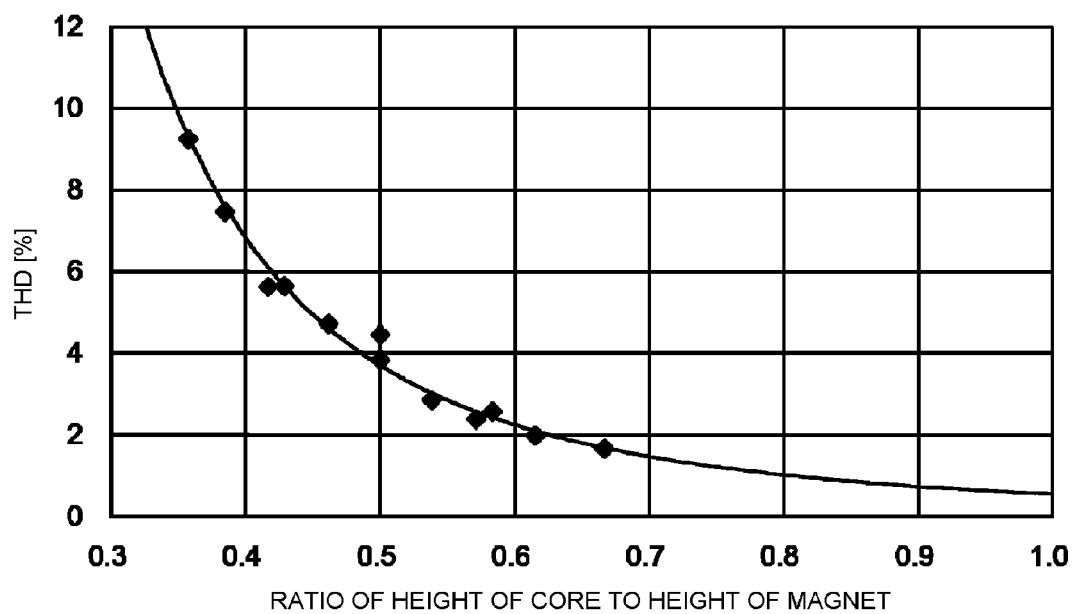
FIG. 5 is a graph illustrating relationships between THD (Total Harmonic Distortion) and the core-magnet height ratio.
Figure 6:
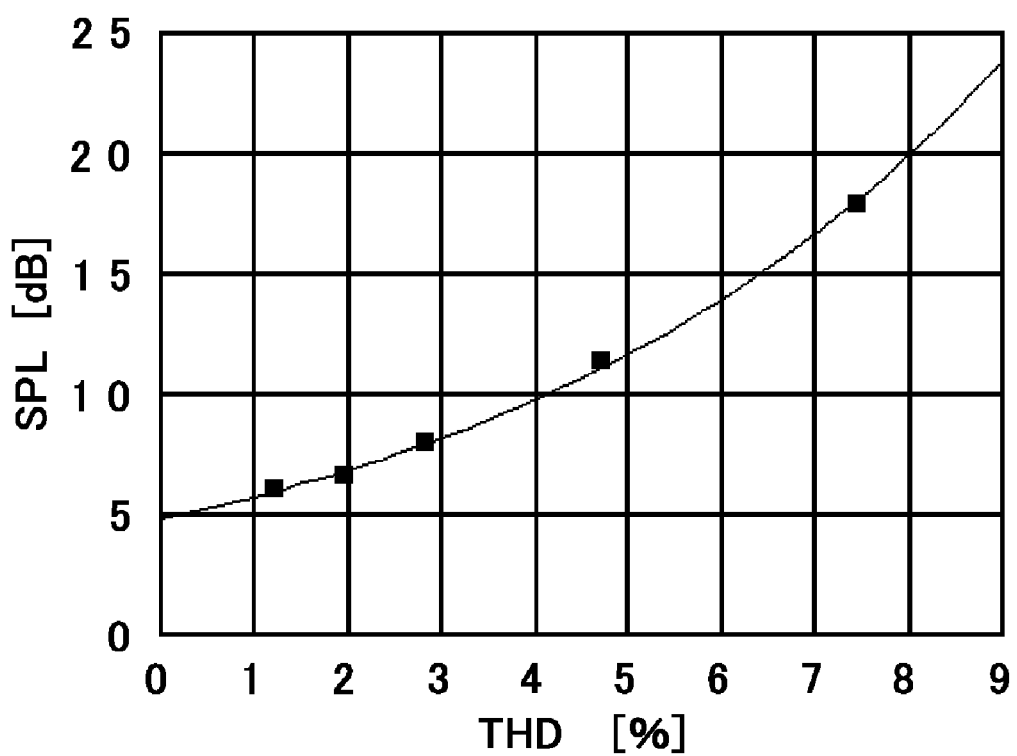
FIG. 6 is a graph illustrating the relationships between SPL (Sound Pressure Level) and THD (Total Harmonic Distortion).

FIG. 5 is a graph illustrating relationships between the core-magnet height ratio and THD (Total Harmonic Distortion). In FIG. 5, the vertical axis represents the THD, while the horizontal axis represents the core-magnet height ratio. The THD refers to the ratio of high frequency components, i.e., waveform distortions, to all frequency components, when the waveform of an induced voltage generated in the stator 22 is converted into multiple frequency components. FIG. 6 is a schematic diagram showing the relationships between SPL (Sound Pressure Level) and THD in which SPL is represented in the vertical axis, and THD is represented in the horizontal axis. SPL represents a pressure of sound and is denoted in decibels (dB) with reference to standard level. It is to be noted that the measurements as recorded in FIG. 6 represent the measurements of SPL of a motor substantially similar to the motor 12 shown in FIG. 1.

It is to be noted that in an environment where background noise is about 30 db, which is substantially equivalent to a quite room, an average absolute threshold for hearing of pure tone for young and adults is between about 10 dB and about 20 dB. As shown in FIG. 6, in a motor such as motor 12 of 7 mm in height, when values of THD are greater than about 4% values of SPL exceed about 10 dB, due to, for example, excitation force. When the values of SPL exceed about 10 dB, vibrations and noises great enough to hinder the performance of motors will be generated. To this end, as shown in FIG. 5, in a motor of 7 mm in height when the core-magnet height ratio is about 50% or greater, the values of THD are reduced below 4%. Since the core-magnet height ratio of the motor 12 is about 61% as described above, it is found that the THD is less than 4%.

Here, the distortions of the waveform of the induced voltage are thought to occur as a result of the density of magnetic flux generated between the stator 22 and the rotor magnet 32 exceeding the saturation density of magnetic flux in the stator core 221. Because the stator core 221 of the motor 12 has a sufficient height, the magnetic flux in the stator core 221 is prevented from being saturated. This leads to limiting the THD to a sufficiently low value, thereby reducing the occurrence of vibrations and noise. Note that, in the present preferred embodiment, the density of the magnetic flux in the stator core 221 is preferably about 1.3 T or less, for example.

The structure of the motor 12 has been described above. The motor 12 is able to limit the THD to less than 4%. This results in preventing a deterioration in torque characteristics, thereby reducing the occurrence of vibrations and noise during drive of the motor 12. In addition, since the torque constant is preferably in the range of, for example, about 3 mNm/A to about 5 mNm/A (both inclusive), efficient generation of the torque can be achieved while limiting the amount of electric current.

Note that the height of the rotor magnet 32 in the motor 12 is not limited to about 2.3 mm, and that it is preferably about 2 mm or more, in order to allow a sufficient torque to be produced between the stator 22 and the rotor magnet 32, and about 3 mm or less, 3 mm being the upper limit that allows the rotor magnet 32 to be used in the motor 12 of the disk drive apparatus 1, which is of the 7 mm high type.

Further, in a motor of 7 mm in height, rotor hubs and the base plates tend to be thin, thereby having durability issues, or the like, which sometimes cause vibrations and noises. Therefore, it is important that in a motor of 7 mm in height, the rotor hubs and the base plates therein are designed to have a specific predetermined thickness while securing enough space for coils to be arranged therein. In order to secure adequate space for coils, the core-magnet ratio is preferably about 75% or greater, for example. Note that the core-magnet height ratio in relation to the rotor magnet 32 is not limited to the aforementioned value, and that it is preferably about 50% or more, in order to allow the THD to be less than about 4%, and about 75% or less, in order to secure a sufficient space for the coils 222.

Moreover, more preferably, the height of the stator core 221 is preferably in the range of, for example, about 16% to about 24% (both inclusive) of the height of the disk drive apparatus 1 of the 7 mm high type, that is, preferably in the range of, for example, about 1.1 mm to about 1.7 mm. This allows a sufficient space to be secured for the coils 222 while preventing the saturation of the magnetic flux.

Also note that the distance between the lower surface 311a of the cover portion 311 of the rotor hub 31 and the upper surface 212 of the base plate 21 of the motor 12 may preferably vary within the range of, for example, about 3.0 mm to about 4.0 mm (both inclusive). Even with the space limited to this degree, the motor 12 is able to produce a sufficient torque while reducing vibrations and noise.

Also note that the number of magnetic steel sheets 221a in the stator 22 may be six, for example. In this case, the height of the stator core 221 is preferably about 1.2 mm, for example. The height of the rotor magnet 32 is preferably about 2 mm or more and, in order to allow the core-magnet height ratio to be about 50% or more, preferably about 2.4 mm or less, for example. This leads to reducing the noise and the vibrations of the motor 12.

Also note that the thickness of each magnetic steel sheet 221a is not limited to about 0.2 mm, and may be about 0.15 mm, for example. In this case, the number of magnetic steel sheets 221a is preferably eight or nine, for example. The height of the stator core 221 is preferably about 1.2 mm or about 1.35 mm, the height of the rotor magnet 32 is preferably in the range of about 2 mm to about 3 mm (both inclusive), and the core-magnet height ratio is preferably in the range of about 50% to about 75% (both inclusive), for example. Also note that magnetic steel sheets 221a having a thickness of about 0.3 mm may be used, with the number of magnetic steel sheets 221a being preferably four, for example. The use in the motor 12 of the magnetic steel sheets 221a each preferably having a thickness of about 0.15 mm, a thickness of about 0.2 mm, or a thickness of about 0.3 mm, which are easily available, for example, makes it possible to manufacture the stator core 221 at a low cost. As described above, the thickness and number of magnetic steel sheets 221a used to define the stator core 221 may vary.

While preferred embodiments of the present invention have been described above, the present invention is not limited to the above-described preferred embodiments, but various modifications are possible. For example, instead of the base plate 21, a base bracket attached to the first housing member 141 may be used as a base portion of the motor 12. It may be so arranged that, regarding the disk drive apparatus 1, a plurality of female screw portions are arranged in the cover portion 311 of the rotor hub 31 in the circumferential direction, and the clamper 151 is secured through the female screw portions.

Note that the structures of the above-described preferred embodiments and various modifications thereof may be combined as appropriate, as long as no conflict occurs.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor for use in a disk drive apparatus, the spindle motor comprising:
a base portion;
a stator arranged above the base portion;
a rotor hub including a cover portion positioned above the stator, and a side wall portion arranged to extend downward from an outer edge of the cover portion;
a rotor magnet positioned radially outward of the stator, and fixed to an inner circumferential surface of the side wall portion of the rotor hub; and
a bearing mechanism arranged to support the rotor hub and the rotor magnet such that the rotor hub and the rotor magnet are rotatable with respect to the base portion and the stator; wherein
a height of the rotor magnet as measured in an axial direction is in a range of about 2 mm to about 3 mm, both inclusive, and a height of a stator core of the stator as measured in the axial direction is in a range of about 50% to about 75%, both inclusive, of the height of the rotor magnet; and
a torque constant of a torque produced between the stator and the rotor magnet is in a range of about 3 mNm/A to about 5 mNm/A, both inclusive.

2. The spindle motor for use in the disk drive apparatus according to claim 1, wherein
the stator core is defined by laminated magnetic steel sheets; and
the magnetic steel sheets are six or seven in number, and each of the magnetic steel sheets has a thickness of about 0.2 mm.

3. The spindle motor for use in the disk drive apparatus according to claim 1, wherein a distance between a lower surface of the cover portion of the rotor hub and an upper surface of the base portion is in a range of about 3 mm to about 4 mm, both inclusive.

4. The spindle motor for use in the disk drive apparatus according to claim 1, wherein a diameter of a lead wire of each coil of the stator is in a range of about 0.10 mm to about 0.14 mm, both inclusive, and a number of turns for each coil is in a range of about 40 to about 70, both inclusive.

5. A disk drive apparatus comprising:
the spindle motor according to claim 1 arranged to rotate a disk;
an access portion arranged to read and/or write information from or to the disk;
a clamper arranged to clamp the disk on the rotor hub; and
a housing arranged to contain the disk, the spindle motor, the access portion, and the clamper.

6. The disk drive apparatus according to claim 5, wherein the clamper is secured at a center of the cover portion of the rotor hub through a screw.

7. The spindle motor for use in the disk drive apparatus according to claim 2, wherein a distance between a lower surface of the cover portion of the rotor hub and an upper surface of the base portion is in a range of about 3 mm to about 4 mm, both inclusive.

8. The spindle motor for use in the disk drive apparatus according to claim 2, wherein a diameter of a lead wire of each coil of the stator is in a range of about 0.10 mm to about 0.14 mm, both inclusive, and a number of turns for each coil is in a range of about 40 to about 70, both inclusive.

9. A disk drive apparatus comprising:
the spindle motor according to claim 2 arranged to rotate a disk;
an access portion arranged to read and/or write information from or to the disk;
a clamper arranged to clamp the disk on the rotor hub; and
a housing arranged to contain the disk, the spindle motor, the access portion, and the clamper.

10. The disk drive apparatus according to claim 9, wherein the clamper is secured at a center of the cover portion of the rotor hub through a screw.

11. The spindle motor for use in the disk drive apparatus according to claim 3, wherein a diameter of a lead wire of each coil of the stator is in a range of about 0.10 mm to about 0.14 mm, both inclusive, and a number of turns for each coil is in a range of about 40 to about 70, both inclusive.

12. A disk drive apparatus comprising:
the spindle motor according to claim 1 arranged to rotate a disk;
an access portion arranged to read and/or write information from or to the disk;
a clamper arranged to clamp the disk on the rotor hub; and a housing arranged to contain the disk, the spindle motor, the access portion, and the clamper.

13. The disk drive apparatus according to claim 12, wherein the clamper is secured at a center of the cover portion of the rotor hub through a screw.

14. A spindle motor for use in a 2.5 inch disk drive apparatus, the spindle motor comprising:
   a base portion;
   a stator arranged above the base portion;
   a rotor hub including a cover portion positioned above the stator, and a side wall portion arranged to extend downward from an outer edge of the cover portion;
   a rotor magnet positioned radially outward of the stator, and fixed to an inner circumferential surface of the side wall portion of the rotor hub; and
   a bearing mechanism arranged to support the rotor hub and the rotor magnet such that the rotor hub and the rotor magnet are rotatable with respect to the base portion and the stator; wherein
   a height of the rotor magnet as measured in an axial direction is in a range of about 2 mm to about 3 mm, both inclusive, and a height of a stator core of the stator as measured in the axial direction is in a range of about 50% to about 75%, both inclusive, of the height of the rotor magnet; and
   a torque constant of a torque produced between the stator and the rotor magnet is in a range of about 3 mNm/A to about 5 mNm/A, both inclusive.

15. The spindle motor for use in the 2.5 inch disk drive apparatus according to claim 14, wherein
   the stator core is defined by laminated magnetic steel sheets; and
   the magnetic steel sheets are six or seven in number, and each of the magnetic steel sheets has a thickness of about 0.2 mm.

16. The spindle motor for use in the 2.5 inch disk drive apparatus according to claim 14, wherein a distance between a lower surface of the cover portion of the rotor hub and an upper surface of the base portion is in a range of about 3 mm to about 4 mm, both inclusive.

17. The spindle motor for use in the 2.5 inch disk drive apparatus according to claim 14, wherein a diameter of a lead wire of each coil of the stator is in a range of about 0.10 mm to about 0.14 mm, both inclusive, and a number of turns for each coil is in a range of about 40 to about 70, both inclusive.

18. A 2.5 inch disk drive apparatus comprising:
   the spindle motor according to claim 14 arranged to rotate a disk;
   an access portion arranged to read and/or write information from or to the disk;
   a clamper arranged to clamp the disk on the rotor hub; and
   a housing arranged to contain the disk, the spindle motor, the access portion, and the clamper.

19. The 2.5 inch disk drive apparatus according to claim 18, wherein the clamper is secured at a center of the cover portion of the rotor hub through a screw.

20. The spindle motor for use in the 2.5 inch disk drive apparatus according to claim 15, wherein a distance between a lower surface of the cover portion of the rotor hub and an upper surface of the base portion is in a range of about 3 mm to about 4 mm, both inclusive.

21. The spindle motor for use in the 2.5 inch disk drive apparatus according to claim 15, wherein a diameter of a lead wire of each coil of the stator is in a range of about 0.10 mm to about 0.14 mm, both inclusive, and a number of turns for each coil is in a range of about 40 to about 70, both inclusive.

22. A 2.5 inch disk drive apparatus comprising:
   the spindle motor according to claim 15 arranged to rotate a disk;
   an access portion arranged to read and/or write information from or to the disk;
   a clamper arranged to clamp the disk on the rotor hub; and
   a housing arranged to contain the disk, the spindle motor, the access portion, and the clamper.

23. The 2.5 inch disk drive apparatus according to claim 22, wherein the clamper is secured at a center of the cover portion of the rotor hub through a screw.

24. The spindle motor for use in the 2.5 inch disk drive apparatus according to claim 16, wherein a diameter of a lead wire of each coil of the stator is in a range of about 0.10 mm to about 0.14 mm, both inclusive, and a number of turns for each coil is in a range of about 40 to about 70, both inclusive.

25. A 2.5 inch disk drive apparatus comprising:
   the spindle motor according to claim 14 arranged to rotate a disk;
   an access portion arranged to read and/or write information from or to the disk;
   a clamper arranged to clamp the disk on the rotor hub; and
   a housing arranged to contain the disk, the spindle motor, the access portion, and the clamper.

26. The 2.5 inch disk drive apparatus according to claim 25, wherein the clamper is secured at a center of the cover portion of the rotor hub through a screw.

* * * * *